(12) United States Patent
Khanka et al.

(10) Patent No.: US 8,537,700 B1
(45) Date of Patent: Sep. 17, 2013

(54) IDENTIFYING AND SELECTIVELY CONTROLLING REVERSE-NOISE CONTRIBUTION ON A PER-ACCESS-TERMINAL BASIS

(75) Inventors: Bhagwan Khanka, Lenexa, KS (US); Manoj Shetty, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 525 days.

(21) Appl. No.: 12/763,206

(22) Filed: Apr. 19, 2010

(51) Int. Cl.
*H04L 1/00* (2006.01)

(52) U.S. Cl.
USPC .................................................. 370/252

(58) Field of Classification Search
None
See application file for complete search history.

(56) References Cited

U.S. PATENT DOCUMENTS

| | | | |
|---|---|---|---|
| 5,475,861 | A | 12/1995 | Hall |
| 5,914,950 | A | 6/1999 | Tiederman, Jr. et al. |
| 5,943,619 | A * | 8/1999 | Coyne et al. ............ 455/433 |
| 6,154,638 | A | 11/2000 | Cheng et al. |
| 6,397,043 | B1 | 5/2002 | Kang |
| 6,597,923 | B1 | 7/2003 | Vanghi et al. |
| 6,671,512 | B2 | 12/2003 | Laakso |
| 6,757,537 | B1 | 6/2004 | Choi et al. |
| 6,944,449 | B1 | 9/2005 | Gandhi et al. |
| 7,054,275 | B2 | 5/2006 | Kim et al. |
| 7,072,630 | B2 | 7/2006 | Lott et al. |
| 7,194,281 | B2 | 3/2007 | Peng et al. |
| 7,215,653 | B2 | 5/2007 | Kim et al. |
| 7,280,510 | B2 | 10/2007 | Lohtia et al. |
| 7,280,511 | B2 | 10/2007 | Ahn |
| 7,315,573 | B2 | 1/2008 | Lusky et al. |
| 7,392,055 | B2 | 6/2008 | Li |
| 7,403,800 | B2 | 7/2008 | Han et al. |
| 7,466,682 | B1 | 12/2008 | Ribas et al. |
| 7,522,919 | B2 | 4/2009 | Yoon et al. |
| 7,609,635 | B2 | 10/2009 | Bae et al. |
| 7,636,322 | B1 * | 12/2009 | Gandhi et al. ............ 370/252 |
| 7,668,561 | B2 | 2/2010 | Au et al. |
| 7,693,032 | B2 | 4/2010 | Li et al. |
| 7,813,323 | B1 | 10/2010 | Talley et al. |
| 7,852,810 | B1 | 12/2010 | Talley et al. |
| 2001/0019943 | A1 | 9/2001 | Bender et al. |
| 2002/0094837 | A1 | 7/2002 | Hamabe et al. |
| 2003/0064741 | A1 | 4/2003 | Silva et al. |
| 2003/0086405 | A1 | 5/2003 | Silva et al. |
| 2003/0134656 | A1 | 7/2003 | Chang et al. |
| 2003/0143190 | A1 | 7/2003 | Iyer et al. |

(Continued)

OTHER PUBLICATIONS

Non-Final Office Action from U.S. Appl. No. 12/026,236 mailed Feb. 2, 2011.

(Continued)

*Primary Examiner* — Yong Zhou

(57) ABSTRACT

Methods and apparatuses are provided for identifying and selectively controlling reverse-noise contribution on a per-access terminal basis. In an embodiment, an access node provides wireless service to access terminals, and measures reverse noise rise (RNR) during at least one turn of a round-robin process involving access terminals taking turns transmitting data or taking turns not transmitting data. The access node thereby determines a respective RNR contribution of at least one access terminal based at least on the measurement of RNR taken during the access terminals' turns. A high-contributor set of one or more access terminals is identified and then instructed to reduce reverse-link transmission power.

25 Claims, 6 Drawing Sheets

(56) References Cited

U.S. PATENT DOCUMENTS

| | | |
|---|---|---|
| 2003/0153272 A1 | 8/2003 | Takano |
| 2003/0206537 A1 | 11/2003 | Choi et al. |
| 2003/0231586 A1 | 12/2003 | Chheda |
| 2004/0047305 A1 | 3/2004 | Ulupinar |
| 2004/0146016 A1 | 7/2004 | Kim et al. |
| 2004/0176042 A1 | 9/2004 | Lott et al. |
| 2004/0193971 A1 | 9/2004 | Soong et al. |
| 2004/0213182 A1 | 10/2004 | Huh et al. |
| 2004/0241803 A1 | 12/2004 | Rosen et al. |
| 2005/0041612 A1 | 2/2005 | Zhang et al. |
| 2005/0107107 A1 | 5/2005 | Shahidi |
| 2005/0197080 A1 | 9/2005 | Ulupinar et al. |
| 2005/0201332 A1 | 9/2005 | Bakshi et al. |
| 2005/0233693 A1 | 10/2005 | Karagouz et al. |
| 2005/0288053 A1 | 12/2005 | Gu |
| 2006/0045045 A1 | 3/2006 | Blessent et al. |
| 2006/0223444 A1 | 10/2006 | Gross et al. |
| 2006/0223565 A1 | 10/2006 | Gandhi et al. |
| 2006/0234638 A1 | 10/2006 | Mueckenheim et al. |
| 2006/0268764 A1* | 11/2006 | Harris ............................ 370/328 |
| 2006/0275782 A1 | 12/2006 | Gunderson et al. |
| 2007/0026884 A1 | 2/2007 | Rao |
| 2007/0129086 A1 | 6/2007 | Toone |
| 2007/0155395 A1 | 7/2007 | Gopalakrishnan et al. |
| 2007/0171808 A1* | 7/2007 | Wu et al. ........................ 370/208 |
| 2007/0191044 A1 | 8/2007 | Kostic et al. |
| 2007/0270100 A1 | 11/2007 | Agrawal et al. |
| 2008/0084841 A1 | 4/2008 | Kim et al. |
| 2008/0137604 A1 | 6/2008 | Lee |
| 2010/0178907 A1 | 7/2010 | Oroskar et al. |

OTHER PUBLICATIONS

Final Office Action from U.S. Appl. No. 12/026,236 mailed Jun. 22, 2011.

Non-Final Office Action from U.S. Appl. No. 12/179,744 mailed May 19, 2011.

Final Office Action from U.S. Appl. No. 11/558,337 mailed Jun. 1, 2010.

Notice of Allowance from U.S. Appl. No. 11/762,534 mailed Jun. 3, 2010.

Notice of Allowance from U.S. Appl. No. 11/619,348 mailed Aug. 19, 2010.

Unpublished U.S. Appl. No. 11/558,337, entitled "Dynamic Adjustment of EV-DO Reverse-Link Transitional Probabilities," filed Nov. 9, 2006 in the name of inventor Andrew Wurtenberger.

Unpublished U.S. Appl. No. 11/619,348, entitled "Dynamic Adjustment of Forward-Link Frame-Error-Rate (FFER) Target," filed Jan. 3, 2007 in the name of inventor Ryan S. Talley.

Unpublished U.S. Appl. No. 11/762,534, entitled "Dynamic Adjustment of Reverse-Link Frame-Error-Rate (RFER) Target Based on Reverse-Link RF Conditions," filed Jun. 13, 2007 in the name of inventor Ryan S. Talley et al.

Unpublished U.S. Appl. No. 12/026,236, entitled "Dynamic Adjustment of Target Frame Error Rate," filed Feb. 5, 2008 in the name of Manghat et al.

Unpublished U.S. Appl. No. 12/179,744, entitled "Conducting Power Control Based on Reverse-Link RF Conditions," filed Jul. 25, 2008 in the name of inventor Manoj Shetty et al.

Unpublished U.S. Appl. No. 12/763,203, filed Apr. 19, 2010 in the name of Goyal et al., entitled "Selectively Conducting Reverse-Link Power Control and Call Admission Control."

Non-Final Office Action from U.S. Appl. No. 11/558,337, mailed May 29, 2009.

Non-Final Office Action from U.S. Appl. No. 11/619,348, mailed May 26, 2009.

Final Office Action from U.S. Appl. No. 11/619,348, mailed Oct. 29, 2009.

Non-Final Office Action from U.S. Appl. No. 11/558,337, mailed Dec. 16, 2009.

Non-Final Office Action from U.S. Appl. No. 11/762,534, mailed Feb. 4, 2010.

Non-Final Office Action from U.S. Appl. No. 11/619,348, mailed Mar. 25, 2010.

Unpublished U.S. Appl. No. 10/910,835, entitled "Dynamic Power Rail Configuration in a Wireless CDMA Communication System," filed Aug. 4, 2004 in the name of Ribas et al.

Non-Final Office Action from U.S. Appl. No. 10/910,835, mailed Nov. 19, 2007.

Final Office Action from U.S. Appl. No. 10/910,835, mailed Jun. 13, 2008.

Advisory Action from U.S. Appl. No. 10/910,835, mailed Aug. 19, 2008.

Published Abstract of Hoe et al., KR20040099837, publication date Dec. 2, 2004, entitled "Method for Controlling the Data Rate of a Mobile Communication System, Particularly for Allowing a Base Station to Change a Data Rate Transition Probability and Transmit It to Mobile Terminal to Effectively Control Each Transmission Data Rate of the Mobile Terminals."

Hye Jeong Lee, "New Rate Control Scheme Based on Adaptive rateLimit for 1xEV-DO Reverse Link Traffic Channels Communications Letters," vol. 9, No. 10, Oct. 2005.

Woo Young Yeo, "An Analytical Model for Reverse Link Rate Control in cdma2000 1xEV-DO Systems," IEEE Communications Letters, vol. 9, No. 3, Mar. 2005.

Esa Tiirola, "Performance of a UMTS Uplink MIMO Scheme," IEEEplore 2003.

Ridha Nasri, "Achieving a high uplink capacity and coverage by using multicariers in 3G-WCDMA Systems," 2004 IEEE.

Notice of Allowance mailed Sep. 29, 2011 for U.S. Appl. No. 12/179,744.

* cited by examiner

| ROUND-ROBIN TURNS | ACCESS TERMINALS | | | AN 200 |
|---|---|---|---|---|
| | AT 102A | AT 102B | AT 102C | |
| TURN 1 | SILENT | NORMAL OPERATION [OR TRANSMIT DATA] | NORMAL OPERATION [OR TRANSMIT DATA] | MEASURE RNR |
| TURN 2 | NORMAL OPERATION [OR TRANSMIT DATA] | SILENT | NORMAL OPERATION [OR TRANSMIT DATA] | MEASURE RNR |
| TURN 3 | NORMAL OPERATION [OR TRANSMIT DATA] | NORMAL OPERATION [OR TRANSMIT DATA] | SILENT | MEASURE RNR |
| TURN 4 (OPTIONAL) | NORMAL OPERATION [OR TRANSMIT DATA] | NORMAL OPERATION [OR TRANSMIT DATA] | NORMAL OPERATION [OR TRANSMIT DATA] | MEASURE RNR |

FIG. 4a

| ROUND-ROBIN TURNS | ACCESS TERMINALS | | | AN 200 |
| --- | --- | --- | --- | --- |
| | AT 102A | AT 102B | AT 102C | |
| TURN 1 | TRANSMIT DATA | NORMAL OPERATION [OR SILENT] | NORMAL OPERATION [OR SILENT] | MEASURE RNR |
| TURN 2 | NORMAL OPERATION [OR SILENT] | TRANSMIT DATA | NORMAL OPERATION [OR SILENT] | MEASURE RNR |
| TURN 3 | NORMAL OPERATION [OR SILENT] | NORMAL OPERATION [OR SILENT] | TRANSMIT DATA | MEASURE RNR |
| TURN 4 (OPTIONAL) | NORMAL OPERATION [OR SILENT] | NORMAL OPERATION [OR SILENT] | NORMAL OPERATION [OR SILENT] | MEASURE RNR |

FIG. 4b

| ACCESS TERMINALS (102A-E) | RESPECTIVE RNR MEASUREMENTS (502A-E) | RESPECTIVE RNR CONTRIBUTIONS (506A-E) |
|---|---|---|
| 102A | 60 | 40 |
| 102B | 30 | 70 |
| 102C | 40 | 60 |
| 102D | 80 | 20 |
| 102E | 20 | 80 |

MEASURED BASELINE RNR VALUE (COVERAGE-AREA-WIDE RNR): 100

FIG. 5

IDENTIFYING AND SELECTIVELY CONTROLLING REVERSE-NOISE CONTRIBUTION ON A PER-ACCESS-TERMINAL BASIS

CROSS-REFERENCE TO RELATED APPLICATIONS

This application hereby incorporates by reference in its entirety and for all purposes the disclosure of the contemporaneously-filed U.S. Patent Application filed in the name of Goyal et al. and entitled "Selectively Conducting Reverse-Link Power Control and Call Admission Control," application Ser. No 12/763,203.

BACKGROUND

1. Cellular Wireless Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Service providers have also introduced mobile stations and wireless networks that communicate using a CDMA protocol known as EV-DO, which stands for "Evolution Data Optimized." EV-DO networks, operating in conformance with one or more releases and/or revisions of industry specification IS-856, such as Release 0 and Revision A, both of which are hereby incorporated herein by reference, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some "hybrid" mobile stations can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a BSC in 1x networks. The access node also includes one or more BTSs, each including one or more antennas that radiate to define wireless coverage areas such as cells and sectors. Note that sectors are used in the balance of this written description as an example of a wireless coverage area, though this is for explanation and not to the exclusion of cells or other coverage areas. Among other functions, the RNC controls one or more BTSs, and acts as a conduit between the BTSs and a PDSN, which provides access to a packet-data network. Thus, when positioned in a sector provided by an access node, an access terminal may communicate over the packet-data network via the access node and the PDSN.

2. Reverse Noise Rise

In general, in a given sector, an access node can provide service to access terminals on one carrier frequency (i.e. carrier), or on more than one. Furthermore, interference can be, and often is, present on a carrier in a sector. As used herein, an instance of a given carrier in a given sector may be referred to as a sector-carrier. In general, on a sector-carrier, an access node receives transmissions from access terminals operating on that sector-carrier. However, the access node often also receives transmissions on that sector-carrier from other access terminals, other devices, and/or any other sources of interference on that frequency.

At a given moment, the sum total of what an access node is receiving on a given sector-carrier is known as the reverse noise on that sector-carrier. At regular intervals access nodes compute reverse noise rise (RNR), which is the difference between (i) the reverse noise that the access node is currently detecting and (ii) a baseline level of reverse noise. Thus, the access node computes how far the reverse noise has risen above that baseline.

To determine the baseline level of reverse noise, EV-DO networks typically periodically utilize what is known as a silent interval. During the silent interval, access terminals know not to transmit anything to the access node. The access node can then measure whatever else is out there. As such, the baseline may correspond to the amount of reverse noise when the sector-carrier is unloaded (i.e. without any transmitting access terminals). Other reverse-link-noise levels, such as 24-hour or other minimums, could also be used as a baseline.

In general, the lower the RNR is at a given moment, the more favorable the RF conditions are for communication between access terminals and an access node at that moment. Correspondingly, the higher the RNR, the less favorable the RF conditions are. Moreover, a low RNR generally corresponds to a sector-carrier being lightly loaded, in other words that is supporting communications for a relatively low number of access terminals. A high RNR, as one might expect, generally corresponds to a sector-carrier being heavily loaded, in other words that is supporting communications for a relatively high number of access terminals.

3. Reverse-Noise-Rise Control

Access nodes typically use the calculated value of RNR to, among other things, determine whether they should instruct access terminals on a carrier to reduce their reverse-link transmission power level. Generally, access nodes may transmit a message to all access terminals on the forward link indicating that the access terminals should reduce their reverse-link transmission power. However, a service provider may desire to regulate reverse-link traffic differently for different access terminals. For example, an access node may be configured to instruct only a subset of access terminals that it is serving to reduce their reverse-link transmission power under certain conditions and according to various criteria.

One specific way access nodes typically instruct access terminals to reduce their reverse-link transmission power level is to set or clear what is known as the Reverse Activity Bit (RAB), which is a value that the access node makes equal to 0 or 1, and repeatedly transmit the RAB to all the access terminals operating on a given sector-carrier. Note that making the RAB equal to 0 is known as "clearing" the RAB, while making the RAB equal to 1 is known as "setting" the RAB. Access terminals typically interpret a set RAB as an indication that they should decrease their reverse-link transmission power, and typically interpret a cleared RAB as an indication that they should increase their reverse-link transmission power.

With respect to how the access node typically chooses whether to set or clear the RAB, if the RNR is above a threshold ("RNR threshold" or "RAB threshold"), which is a configurable parameter that may be between 0 dB and 30 dB, the access node sets the RAB. If the RNR is below the RNR threshold, the access node clears the RAB. The access node transmits the RAB in a TDM channel—known as the reverse-activity channel—on the forward link. That channel is itself a TDM portion of a forward-link channel known as the Media Access Control (MAC) channel. The initial release of IS-856 is referred to as Release 0 (Rel. 0), while a subsequent revision is referred to as Revision A (Rev. A). Note that some EV-DO networks may provide both Rel. 0 and Rev. A service; that is, a given EV-DO network may provide service to access terminals that operate according to Rel. 0, and also to access terminals that operate according to Rev. A.

OVERVIEW

As explained, a service provider may desire to regulate reverse-link traffic differently for different access terminals. For example, when RNR has increased above a certain threshold, a significant portion of the increase may be attributable to the reverse-link activity of only a subset of one or more access terminals being served by a given access node. RNR may therefore be decreased by instructing only those access terminals that are contributing most to RNR to reduce their respective reverse-link transmission power level. As a result, RNR in the coverage area of the access node may be decreased by targeting access terminals that are contributing most to RNR, as opposed to decreasing the reverse-link transmission power of all access terminals being served by the access node.

When identifying and selectively controlling reverse-noise contribution on a per-access-terminal basis, it is desirable to accurately and efficiently identify those access terminals that are contributing most to RNR. Accordingly, an embodiment provides for identification of those access terminals contributing most to RNR by using direct RNR measurements during a round-robin process to determine the respective RNR contribution of access terminals being served by an access node. This embodiment further provides for differentiated regulation of the respective reverse-link activity of the access terminals.

In accordance with the present methods, apparatuses, and systems, an access node provides wireless service to a plurality of access terminals on a carrier in a coverage area. The carrier comprises a reverse link on which the access terminals may transmit data to the access node. The access node takes a measurement of RNR on the carrier during at least one turn of a round-robin process. The round-robin process includes at least one of (a) the access terminals in the plurality taking turns not transmitting data on the reverse link or (b) the access terminals in the plurality taking turns transmitting data on the reverse link.

Further, in accordance with the present methods, apparatuses, and systems, the access node determines a respective RNR contribution of at least one access terminal in the plurality. The access node uses the measurement of RNR taken during the at least one access terminal's respective turn in the round-robin process to determine the respective RNR contribution of the at least one access terminal. The access node also uses the at least one determined RNR contribution to identify a high-contributor set of one or more access terminals in the plurality. The access terminals in the high-contributor set are instructed to reduce their respective reverse-link transmission power level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 4 depicts round-robin processes, in accordance with at least one embodiment; and FIG. 5 is a table of access-terminal-specific reverse-noise-rise measurements and contributions, in accordance with at least one embodiment.

DETAILED DESCRIPTION OF THE DRAWINGS

1. Exemplary Architecture a. Exemplary Communication System

Figure 1:
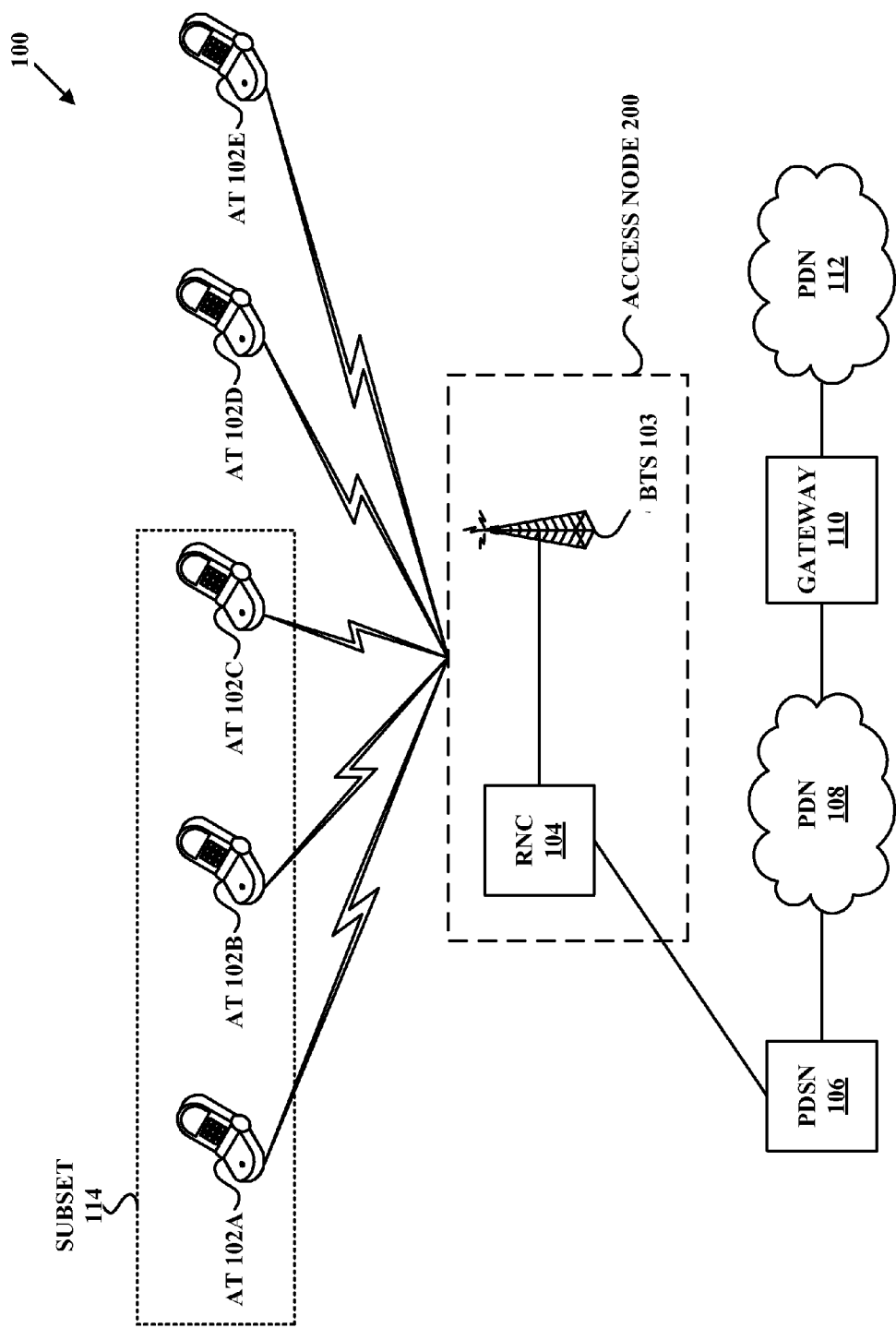
FIG. 1 is a simplified block diagram of a communication system, in accordance with at least one embodiment.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes access terminals (ATs) 102A-E, an access node 200 (shown as comprising a BTS 103 and an RNC 104), a PDSN 106, a packet-data network (PDN) 108, a gateway 110, and a PDN 112. Additional entities could be present as well. For example, there could be additional access terminals in communication with access node 200; also, there could be additional entities in communication with PDN 108 and/or PDN 112. Also, there could be one or more routers, switches, other devices, and/or other networks making up at least part of one or more of the communication links.

Each of the access terminals 102A-E may be or include any device arranged to carry out the access-terminal functions described herein, and may include a user interface, a wireless-communication interface, a processor, and data storage containing instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also or instead be able to communicate with a 1xRTT CDMA network, a Wi-Fi (IEEE 802.11) network, and/or one or more additional types of wireless networks. The processor and data storage may be any suitable components known to those of skill in the art. As examples, each of the access terminals 102A-E could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein, and may include a communication interface, a processor, and data storage containing instructions executable by the processor to carry out those BTS functions. The communication interface may include one or more antennas and chipsets or other components for providing one or more coverage areas such as cells or sectors according to a protocol such as CDMA, EV-DO, WiMax, and/or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage containing instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

PDSN 106 may be any networking server or other device arranged to carry out the PDSN functions described herein. PDSN 106 may include a communication interface, a processor, and data storage containing instructions executable by the processor for carrying out those PDSN functions. The communication interface may include a wired packet-data interface such as an Ethernet interface for communicating with access node 200 and/or over PDN 108. Note that PDSN 106 may, instead or in addition, comprise a wireless-communication interface for communicating with access node 200 and/or over PDN 108. Note also that PDSN 106 may use the same interface or separate interfaces for communicating with access node 200 and for communicating over PDN 108. PDSN 106 may generally function to provide access node 200 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 200 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage containing instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

b. Exemplary Access Node

As described above with reference to FIG. 1, access node 200 may comprise BTS 103 and RNC 104, and access node 200 may comprise one or more additional BTSs as well. In general, access node 200 provides wireless service to access terminals over an air interface, and uses a backhaul connection to provide transport service over PDN 108 (or perhaps PDN 108 and PDN 112) to those access terminals.

Figure 2:
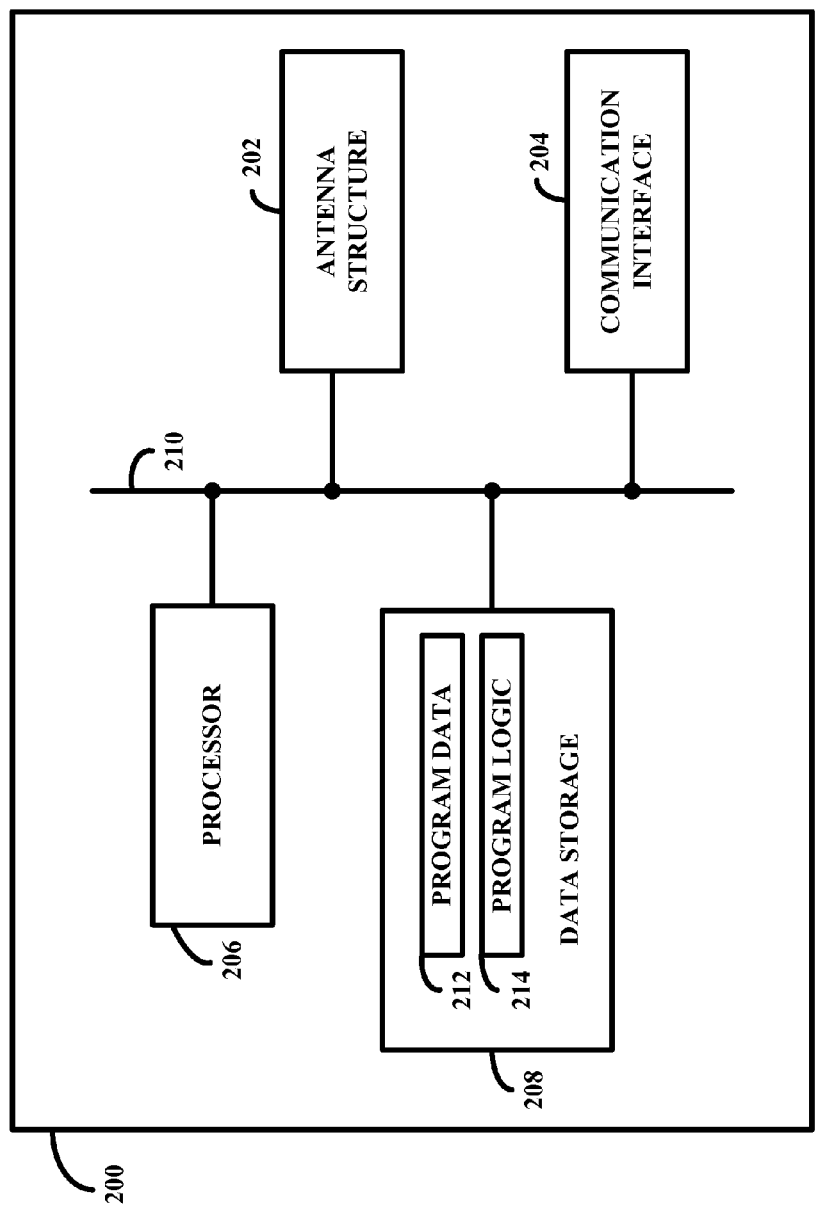
FIG. 2 is a simplified block diagram illustrating an access node, showing functional components that can operate to carry out aspects of at least one embodiment.

The functions described herein may be carried out by access node 200. Accordingly, FIG. 2 is a simplified block diagram of access node 200, showing functional components that can operate to carry out aspects of those functions. As shown in FIG. 2, access node 200 includes, without limitation, an antenna structure 202, a communication interface 204, a processor 206, and data storage 208, all linked together via a system bus, network, or other connection mechanism 210. The exemplary access node 200 may also include other components.

The antenna structure 202 of the access node 200 may provide one or more air interfaces over which the access terminals 102A-E may communicate with the access node 200. The antenna structure 202 may be arranged in various ways. For example, the antenna structure 202 may include one or more antennas. The one or more antennas may include one or more omni-directional antennas and/or one or more directional (e.g., sectored) antennas. The one or more antennas may include one or more antennas for receiving RF signals and one or more antennas for transmitting RF signals away from the antenna structure 202. And of course many suitable arrangements are possible.

The communication interface 204 preferably functions to communicatively couple the access node 200 to other networks, such as the PDSN 106. As such, corresponding to the communications interface of the RNC discussed above, communication interface 204 may include a wired (e.g., Ethernet)

and/or wireless (e.g., Wi-Fi) packet-data interface for communicating directly or over one or more networks with PDSN 106. The access node 200 may also include multiple communication interfaces 204, such as one via which the access node 200 sends communication, and one via which the access node 200 receives communication. And of course many suitable arrangements are possible.

The processor 206 may comprise one or more general purpose microprocessors and/or dedicated signal processors. Data storage 208, in turn, may comprise memory and/or other storage components, such as optical, magnetic, organic or other memory disc storage, which can be volatile and/or non-volatile, internal and/or external, and integrated in whole or in part with the processor 206. Data storage 208 preferably contains or is arranged to contain (i) program data 212 and (ii) program logic 214. Although these components are described herein as separate data-storage elements, the elements could just as well be physically integrated together or distributed in various other ways. For example, the program data 212 may be maintained in data storage 208 separate from the program logic 214, facilitating updating and reference by program logic 214.

Program data 212 may contain information about the wireless coverage areas of the access node 200. Program data 212 may also contain information about the identity of the access terminals 102A-E. Program logic 214 may comprise machine-language instructions that may be executed and/or interpreted by the processor 206 to carry out functions described herein, including those described with respect to FIG. 3. It should be understood, however, that the program logic 214 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

2. Exemplary Operation

Figure 3:
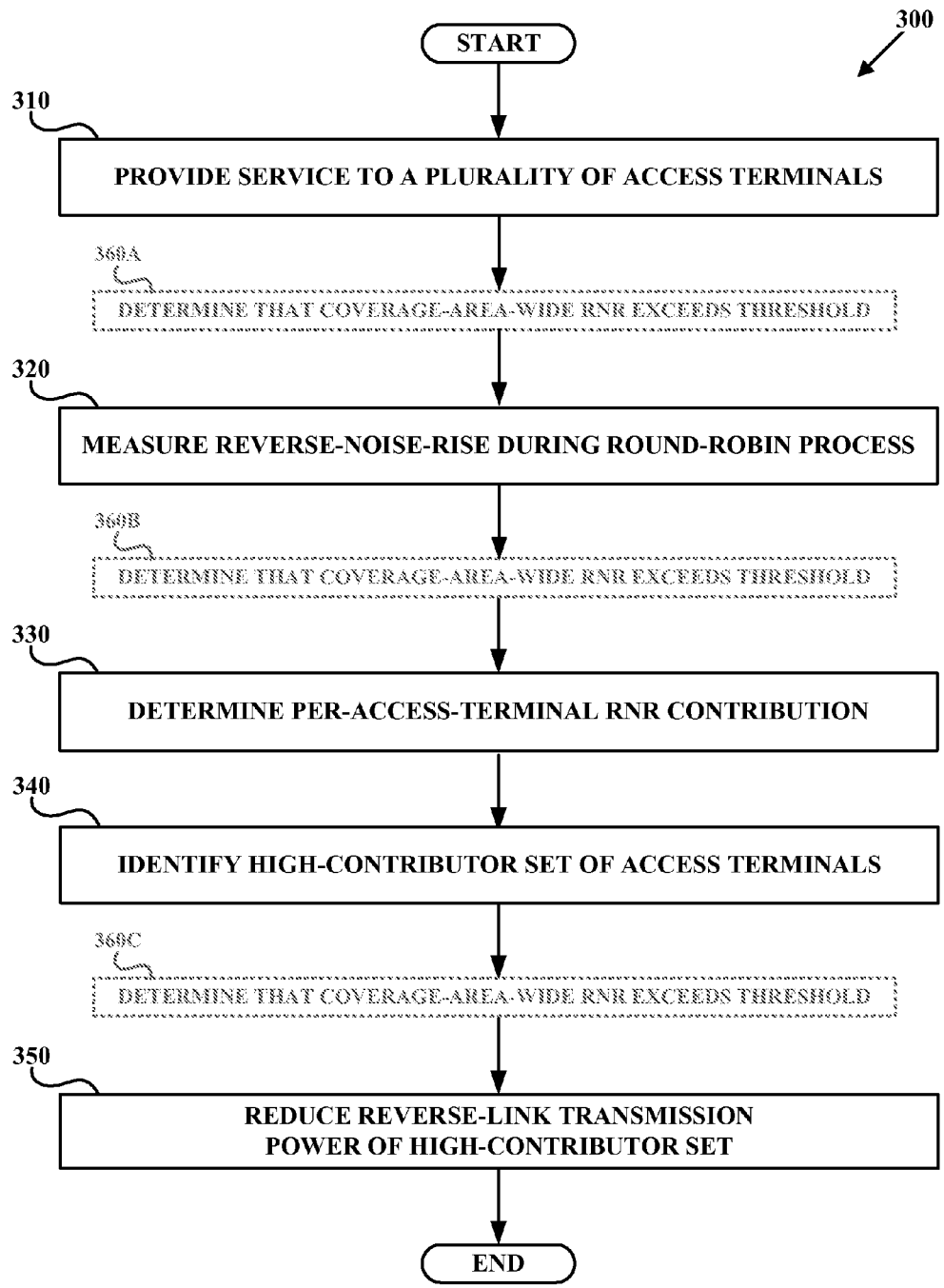
FIG. 3 is a flow chart of a method, in accordance with at least one embodiment.

FIG. 3 depicts a method that may be carried out by an access node such as access node 200. Although method 300 is described herein as being carried out by access node 200, this is not required; in general, method 300 may be carried out by an access node, a BTS, an RNC, a PDSN, one or more other network entities, or some combination thereof.

a. Provide Wireless Service to a Plurality of Access Terminals

At step 310, access node 200 provides wireless service to a plurality of access terminals on a carrier (e.g. a sector-carrier) in a coverage area. The referenced plurality of access terminals may be a subset of a larger group of access terminals to which the access node is providing wireless service on the carrier in the coverage area. So while the referenced plurality could be all access terminals to which access node 200 is currently providing wireless service, such as access terminals 102A-E, the referenced plurality could just as well be a subset 114 of access terminals in the larger group 102A-E, such as access terminals 102A-C.

In an embodiment, the subset 114 consists of those access terminals in the larger group that are operating according to either IS-856, Rel. 0 or IS-856, Rel. A. In another embodiment, the subset 114 consists of those access terminals in the larger group that are operating according to any given particular communications protocol. In still another embodiment, the subset 114 consists of those access terminals in the larger group that are roaming, that is, those access terminals in the larger group that do not have a wireless-service account with the particular wireless-service provider that operates the access node.

Additionally, the larger group of access terminals being served by access node 200 may include more than one defined subset of access terminals. For example, in one embodiment, the referenced plurality of access terminals may be a first subset consisting of those access terminals in the larger group that have a wireless-service account with whichever particular wireless-service provider that operates the access node. A second subset of access terminals on the carrier in the coverage area may correspondingly consist of those access terminals on the carrier that do not have a wireless-service account with that provider.

Such an embodiment may involve the access node instructing the access terminals in the second subset—i.e., those access terminals on the carrier that do not have a wireless-service account with the particular wireless-service provider—to reduce their respective reverse-link transmission power level. Accordingly, the access terminals in the first subset may participate in the round-robin process, and some of them (perhaps just a few) might accordingly be instructed to reduce their respective reverse-link transmission power, whereas the access terminals in the second subset will inevitably be instructed to reduce their respective reverse-link transmission power. The instruction to access terminals in the second subset may be given at any time during which access node 200 carries out the method depicted in FIG. 3, such as before any of steps 320, 330, or 350. The instruction may also be given at any time during which access node 200 is not carrying out the method depicted in FIG. 3.

b. Measure Reverse Noise Rise During Round-Robin Process

At step 320, access node 200 takes a measurement of RNR on the carrier during at least one turn of a round-robin process. The round-robin process may be carried out in a number of ways including each, or a combination, of the ways described herein. In a first embodiment, as depicted in FIG. 4a, the access terminals in the referenced plurality take turns not transmitting data on the reverse link. In a second embodiment, as depicted in FIG. 4b, the access terminals in the referenced plurality take turns transmitting data on the reverse link. Thus, regardless of the specific implementation of the round-robin process, the round-robin process includes the access terminals in the plurality taking turns transmitting and/or not transmitting data.

With reference to FIG. 4a, for example, assume access node 200 provides wireless service to a plurality of access terminals that, in this case, is subset 114 consisting of access terminals 102A-C. During turn 1 of the round-robin process, access terminal 102A is silent (does not transmit data), while access terminals 102B and 102C continue in normal operation. Accordingly, during turn 1 access terminals 102B and 102C may, or may not, transmit data. Then, during turn 2 and turn 3, access terminal 102B and access terminal 102C, respectively, are silent while the other access terminals in the plurality continue in normal operation. Note that during each turn, access node 200 may take a measurement of RNR.

Correspondingly, with reference to FIG. 4b, for example, assume access node 200 provides wireless service to a plurality of access terminals that, in this case also, is subset 114 consisting of access terminals 102A-C. During turn 1 of the round-robin process, access terminal 102A transmits data, while access terminals 102B and 102C continue in normal operation. Accordingly, during turn 1 access terminals 102B and 102C may, or may not, transmit data. Then, during turn 2 and turn 3, access terminal 102B and access terminal 102C, respectively, transmit data while the other access terminals in the plurality continue in normal operation. Note again that during each turn, access node 200 may take a measurement of RNR.

The round-robin process may comprise the access terminals in the plurality taking turns according to any identifier that uniquely identifies each of the respective access terminals in the plurality. In one embodiment, the access terminals in the plurality may take turns according to MAC IDs respectively associated with the access terminals in the plurality. In another embodiment, the access terminals in the plurality may take turns according to Walsh codes respectively associated with the access terminals in the plurality. In still another embodiment, the access terminals in the plurality may take turns according to round-robin sequence numbers assigned respectively by the access node. For example, the access node may assign respectively to each access terminal in the plurality a round-robin sequence number, perhaps upon the access terminal registering with the access node for wireless service.

Further, the access terminals in the plurality taking turns not transmitting data on the reverse link, as depicted in FIG. 4a, may comprise the access terminals in the plurality taking turns as the only access terminal not transmitting data on the reverse link. Thus, during turn 1 as depicted in FIG. 4a, for example, access terminal 102A would be silent while access terminals 102B and 102C would transmit data. Correspondingly, the access terminals in the plurality taking turns transmitting data on the reverse link, as depicted in FIG. 4b, may comprise the access terminals in the plurality taking turns as the only access terminal transmitting data on the reverse link. Thus, during turn 1 as depicted in FIG. 4b, for example, access terminal 102A would transmit data while access terminals 102B and 102C would be silent.

As will be apparent to those skilled in the art, the access terminals in the plurality taking turns as either the only access terminal transmitting data or the only access terminal not transmitting data may enable a relatively more accurate determination of the access terminals' respective RNR contribution. However, this may also be relatively more disruptive to user experience across all access terminals in the plurality, as normal operation of each access terminal in the plurality may be impacted during each round.

Even further, the round-robin process may comprise at least one access terminal taking more than one turn, and thus access node 200 may take measurements of RNR during at least one, and perhaps each, of a given access terminal's respective turns in the round-robin process. As will be apparent to those skilled in the art, multiple measurements of RNR may further enable a relatively more accurate determination of the access terminals' respective RNR contribution.

c. Determine Per-Access-Terminal RNR Contribution

At step 330, access node 200 determines a respective RNR contribution of at least one access terminal in the plurality based at least on the measurement of RNR taken by access node 200 during the at least one access terminal's respective turn in the round-robin process. For example, with reference to FIG. 4, access node 200 may determine the respective RNR contribution of access terminal 102A based at least on the measurement of RNR taken by access node 200 during turn 1 in the round-robin process.

Step 330 may comprise determining the RNR contribution of a given access terminal using a baseline RNR value and the measurement of RNR taken by the access node during the given access terminal's turn in the round-robin process. In one embodiment, the baseline RNR value may be a coverage-area-wide RNR. The coverage-area-wide RNR may be measured while all access terminals being served by access node 200 are in normal operation, or may be measured while all such access terminals are transmitting data. In another embodiment, the baseline RNR value may be a silent-interval RNR. The silent-interval RNR may be measured while all access terminals being served by access node 200 are silent.

When the round-robin process comprises the access terminals in the plurality taking turns not transmitting data on the reverse link as depicted in FIG. 4a, the respective RNR contribution of a given access terminal may be determined by calculating the difference between (i) the RNR measured during the given access terminal's respective turn in the round-robin process and (ii) a measurement of the coverage-area-wide RNR.

Correspondingly, when the round-robin process comprises the access terminals in the plurality taking turns transmitting data on the reverse link as depicted in FIG. 4b, the respective RNR contribution of a given access terminal may be determined by calculating the difference between (i) the RNR measured during the given access terminal's respective turn in the round-robin process and (ii) a measurement of the silent-interval RNR. It should be noted, however, that in either case the contribution of a given access terminal may be determined by calculating the difference between the RNR measured during the given access terminal's respective turn in the round-robin process, and any suitable baseline RNR value.

The coverage-area-wide RNR, as well as the silent-interval RNR, may be measured during a coverage-area-wide-RNR turn, or a silent-interval-RNR turn, respectively, during the round-robin process, as depicted by turn 4 in FIGS. 4a and 4b. Alternatively, the access node may measure the coverage-area-wide RNR, as well as the silent-interval RNR, at a time other than during the round-robin process.

Thus, when the round-robin process comprises the access terminals in the plurality taking turns not transmitting data on the reverse link, the access node may determine the RNR contribution of a given access terminal using a coverage-area-wide RNR, and the measurement of RNR taken by the access node during the given access terminal's turn in the round-robin process, and the access node may either (a) measure the coverage-area-wide RNR during a coverage-area-wide-RNR turn during the round-robin process or (b) measure the coverage-area-wide RNR at a time other than during the round-robin process, or both.

Correspondingly, when the round-robin process comprises the access terminals in the plurality taking turns transmitting data on the reverse link, the access node may determine the RNR contribution of a given access terminal using a silent-interval RNR, and the measurement of RNR taken by the access node during the given access terminal's turn in the round-robin process, and the access node may either (a) measure the silent-interval RNR during a silent-interval-RNR turn during the round-robin process or (b) measure the silent-interval RNR at a time other than during the round-robin process, or both.

Note that the access node may or may not determine the RNR contribution of all access terminals in the plurality. For example, the access node may only determine the RNR contribution of access terminals until it has determined that the respective RNR contribution of a given access terminal is above a particular threshold. Alternatively, the access node may only determine the RNR contribution of access terminals until it has determined that a particular number of access terminals have a respective RNR contribution above a particular threshold. And other examples are certainly possible.

Correspondingly, the access node may or may not take a measurement of RNR on the carrier during each turn in the round-robin process. For example, the access node may only take a measurement of RNR until it has determined that the respective RNR contribution of a given access terminal is above a particular threshold. Alternatively, the access node may only take a measurement of RNR until it has determined that a particular number of access terminals have a respective RNR contribution above a particular threshold. And again other examples are certainly possible.

Further, as discussed above, the round-robin process may comprise at least one access terminal taking more than one turn, and accordingly access node 200 may take measurements of RNR during each of a given access terminal's multiple respective turns in the round-robin process. When the access node 200 has taken more than one measurement of RNR for a respective access terminal, determining the respective RNR contribution of a given access terminal in the plurality may be based on one, multiple, or all of the respective measurements of RNR taken. For example, the determination may include using the greatest measurement of RNR taken during each of the given access terminal's turns during the round-robin process. As another example, the determination may include averaging the measurements of RNR taken during each of the given access terminal's turns during the round-robin process.

d. Identify High-Contributor Set of Access Terminals

At step 340, access node 200 uses at least one determined RNR contribution to identify a high-contributor set of one or more access terminals in the plurality. The access node may be configured to identify a high-contributor set according to any criteria consistent with network management goals of a given wireless-service provider operating the access node 200.

By way of illustration and not limitation, FIG. 5 shows RNR measurement values 502A-E for each of the plurality of access terminals 102A-E, taken during respective turns of an example of a round-robin process. For ease in explanation, all numbers in FIG. 5 are shown as unitless values and are intended only to indicate relative values, as opposed to any actual, representative, or realistic values. FIG. 5 also shows a theoretical baseline RNR value 504 that, in this case, indicates a coverage-area-wide RNR measurement. Further, FIG. 5 shows respective RNR contributions 506A-E of access terminals 102A-E, which have been determined by calculating the difference between the measurements of RNR 502A-E and the baseline RNR value 504.

Again, all numbers in FIG. 5 are meant to indicate relative measurements to assist in explanation of the process disclosed herein. The numbers used are not necessarily accurate, representative, or realistic representations of values.

In one embodiment, the high-contributor set may consist of those access terminals, among those access terminals in the plurality, having an RNR contribution that is greater than a threshold portion of a coverage-area-wide RNR. For example, with reference to FIG. 5, assuming a threshold portion of coverage-area-wide RNR of 50%, the high-contributor set would consist of those access terminals having an RNR contribution that is greater than 50, or access terminals 102B, 102C, and 102E. As another example, assuming a threshold portion of coverage-area-wide RNR of 75%, the high-contributor set would consist of those access terminals having an RNR contribution that is greater than 75, or access terminal 102E.

In another embodiment, the high-contributor set may consist of those access terminals, among those access terminals in the plurality, having an RNR contribution that is greater than a threshold multiple of an average of all determined RNR contributions. With reference to FIG. 5, the average of all determined RNR contributions 106A-E is 54. In accordance with this embodiment, for example, a threshold multiple of 1.2 would correspond to a threshold multiple of the average RNR contributions equal to 64.8, and the high-contributor set would consist of those access terminals having an RNR contribution that is greater than 64.8, or access terminals 102B and 102E. As another example, a threshold multiple of 1.4 would correspond to a threshold multiple of the average RNR contributions equal to 75.6, and the high-contributor set would consist of those access terminals having an RNR contribution that is greater than 75.6, or access terminal 102E.

In still another embodiment, the high-contributor set may consist of a pre-determined number of access terminals, among the access terminals in the plurality, having the greatest RNR contribution. For example, with reference to FIG. 5, assuming the pre-determined number of access terminals is three, the high-contributor set would consist of the three access terminals 102B, 102C, and 102E. Further, the pre-determined number of access terminals may be determined according to a percentage of the total number of access terminals in the plurality. For example, the pre-determined number of access terminals might be taken to be 40% of the total number of access terminals in the plurality and thus, with reference to FIG. 5, the high-contributor set would consist of the two access terminals having the greatest RNR contribution. Accordingly, the high-contributor set would consist of the two access terminals 102B and 102E.

e. Reduce Reverse-Link Transmission Power of High-Contributor Set

At step 350, access node 200 instructs the access terminals in the high-contributor set to reduce their respective reverse-link transmission power level. Access node 200 may instruct the access terminals to reduce their respective reverse-link transmission power level using any message that indicates that the access terminals should reduce their reverse-link transmission power. As one example, instructing the access terminals in the high-contributor set to reduce their respective reverse-link transmission power level may comprise transmitting a set RAB to the access terminals in the high-contributor set.

f. Conditioning on Coverage-Area-Wide RNR

As a final point regarding method 300, optional steps 360A-C indicate that the carrying out of any of the steps 320, 330, 340, and 350 may be conditioned on access node 200 determining that a coverage-area-wide RNR exceeds a coverage-area-wide-RNR threshold. That is to say that the disclosed round-robin approach may be a measure that is employed in response to detecting that the prevailing RF conditions are unfavorable.

3. Conclusion

Various exemplary embodiments have been described above. Those skilled in the art will understand, however, that changes and modifications may be made to those examples without departing from the scope of the claims.

The invention claimed is:
1. A method comprising:
an access node providing wireless service to a plurality of access terminals on a carrier in a coverage area, the carrier comprising a reverse link;
the access node taking a measurement of reverse noise rise (RNR) on the carrier during at least one turn of a round- robin process that comprises the access terminals in the plurality taking turns transmitting traffic data on the reverse link;

the access node determining a respective RNR contribution of at least one access terminal in the plurality wherein, for each access terminal for which the access node determines a respective RNR contribution, the access node does so using at least a baseline RNR value and the measurement of RNR taken by the access node during the at least one access terminal's respective turn in the round-robin process, wherein the baseline RNR value is a silent-interval RNR, the method further comprising at least one of (a) the access node measuring the silent-interval RNR during a silent-interval-RNR turn, wherein the round-robin process further comprises the silent-interval-RNR turn and (b) the access node measuring the silent-interval RNR at a time other than during the round-robin process;

the access node using the at least one determined RNR contribution to identify a high-contributor set of one or more access terminals in the plurality; and the access node instructing the access terminals in the high-contributor set to reduce their respective reverse-link-traffic transmission power level.

2. The method of claim 1, wherein the plurality of access terminals is a subset of a larger group of access terminals to which the access node is providing wireless service on the carrier in the coverage area.

3. The method of claim 2, wherein the subset consists of those access terminals in the larger group that are at least one of (a) operating according to IS-856, Release 0, (b) operating according to IS-856, Revision A, (c) operating according to a particular communications protocol, and (d) roaming.

4. The method of claim 2, wherein the subset is a first subset, wherein the first subset consists of those access terminals in the larger group that have a wireless-service account with a particular wireless-service provider that operates the access node, the method further comprising:

the access node also providing wireless service to a second subset of access terminals on the carrier in the coverage area, the second subset of access terminals consisting of those access terminals on the carrier that do not have a wireless-service account with the particular wireless-service provider that operates the access node; and the access node instructing the access terminals in the second subset to reduce their respective reverse-link-traffic transmission power level.

5. The method of claim 1, wherein the round-robin process comprises the access terminals in the plurality taking turns according to at least one of (a) MAC IDs respectively associated with the access terminals in the plurality, (b) Walsh codes respectively associated with the access terminals in the plurality, and (c) round-robin sequence numbers assigned respectively by the access node.

6. The method of claim 1, wherein the access terminals in the plurality taking turns transmitting traffic data on the reverse link comprises the access terminals in the plurality taking turns as the only access terminal transmitting traffic data on the reverse link.

7. The method of claim 1, wherein the round-robin process comprises at least one access terminal taking more than one turn.

8. The method of claim 7, wherein determining the respective RNR contribution of a given access terminal in the plurality is based on the measurements of RNR taken during each of the given access terminal's turns during the round-robin process.

9. The method of claim 1, wherein determining the RNR contribution of the at least one access terminal in the plurality further comprises determining the RNR contribution of all access terminals in the plurality.

10. The method of claim 1, wherein the high-contributor set consists of those access terminals, among the access terminals in the plurality, having an RNR contribution that is greater than a threshold portion of a coverage-area-wide RNR.

11. The method of claim 1, wherein the high-contributor set consists of those access terminals, among the access terminals in the plurality, having an RNR contribution that is greater than a threshold multiple of an average of all determined RNR contributions.

12. The method of claim 1, wherein the high-contributor set consists of a given set of a pre-determined number of access terminals each having, among the access terminals in the plurality, a respective RNR contribution that is comparatively higher than that of any access terminal that is in the plurality but that is not in the given set.

13. The method of claim 1, wherein instructing the access terminals in the high-contributor set to reduce their respective reverse-link-traffic transmission power level comprises transmitting a set reverse activity bit (RAB) to the access terminals in the high-contributor set.

14. The method of claim 1, wherein the access node instructing the access terminals in the high-contributor set to reduce their respective reverse-link-traffic transmission power level is conditioned on the access node determining that a coverage-area-wide RNR exceeds a coverage-area-wide-RNR threshold.

15. The method of claim 14, wherein the access node (i) determining an RNR contribution of at least one access terminal in the plurality and (ii) using the at least one determined RNR contribution to identify the high-contributor set are also conditioned on the access node determining that the coverage-area-wide RNR exceeds the coverage-area-wide-RNR threshold.

16. The method of claim 15, wherein the access node taking a measurement of RNR on the carrier during at least one turn of the round-robin process is also conditioned on the access node determining that the coverage-area-wide RNR exceeds the coverage-area-wide-RNR threshold.

17. An access node comprising:
a communication interface comprising a wireless-communication interface;
a processor; and
data storage containing program instructions executable by the processor for causing the access node to carry out functions including:
providing wireless service to a plurality of access terminals on a carrier in a coverage area, the carrier comprising a reverse link;
taking a measurement of reverse noise rise (RNR) on the carrier during at least one turn of a round-robin process that comprises the access terminals in the plurality taking turns transmitting traffic data on the reverse link;
determining a respective RNR contribution of at least one access terminal in the plurality wherein, for each access terminal for which the access node determines a respective RNR contribution, the access node does so using at least a baseline RNR value and the measurement of RNR taken by the access node during the at least one access terminal's respective turn in the round-robin process, wherein the baseline RNR value is a silent-interval RNR, the method further comprising at least one of (a) the access node measuring the silent-interval RNR during a silent-interval-RNR turn, wherein the round-robin process further comprises the silent-interval-RNR turn and (b) the access node measuring the silent-interval RNR at a time other than during the round-robin process;

using the at least one determined RNR contribution to identify a high-contributor set of one or more access terminals in the plurality; and instructing the access terminals in the high-contributor set to reduce their respective reverse-link-traffic transmission power level.

18. The access node of claim 17, wherein the plurality of access terminals is a subset of a larger group of access terminals to which the access node is providing wireless service on the carrier in the coverage area.

19. The access node of claim 18, wherein the subset is a first subset, wherein the first subset consists of those access terminals in the larger group that have a wireless-service account with a particular wireless-service provider that operates the access node, the method further comprising:

the access node also providing wireless service to a second subset of access terminals on the carrier in the coverage area, the second subset of access terminals consisting of those access terminals on the carrier that do not have a wireless-service account with the particular wireless-service provider that operates the access node; and the access node instructing the access terminals in the second subset to reduce their respective reverse-link-traffic transmission power level.

20. The access node of claim 17, wherein the round-robin process comprises the access terminals in the plurality taking turns according to at least one of (a) MAC IDs respectively associated with the access terminals in the plurality, (b) Walsh codes respectively associated with the access terminals in the plurality, and (c) round-robin sequence numbers assigned respectively by the access node.

21. The access node of claim 17, wherein the access terminals in the plurality taking turns transmitting traffic data on the reverse link comprises the access terminals in the plurality taking turns as the only access terminal transmitting traffic data on the reverse link.

22. The access node of claim 17, wherein determining the RNR contribution of the at least one access terminal in the plurality further comprises determining the RNR contribution of all access terminals in the plurality.

23. The access node of claim 17, wherein the high-contributor set consists of those access terminals, among the access terminals in the plurality, having an RNR contribution that is greater than a threshold portion of a coverage-area-wide RNR.

24. The access node of claim 17, wherein the high-contributor set consists of those access terminals, among the access terminals in the plurality, having an RNR contribution that is greater than a threshold multiple of an average of all determined RNR contributions.

25. The access node of claim 17, wherein the high-contributor set consists of a given set of a pre-determined number of access terminals each having, among the access terminals in the plurality, a respective RNR contribution that is comparatively higher than that of any access terminal that is in the plurality but that is not in the given set.

* * * * *